United States Patent [19]
Welk, Jr.

[11] 3,776,043
[45] Dec. 4, 1973

[54] FLUIDIC ANGULAR DISPLACEMENT SENSOR

[75] Inventor: Horace B. Welk, Jr., Churchville, Pa.

[73] Assignee: Casco Products Corporation, Bridgeport, Conn.

[22] Filed: Mar. 31, 1972

[21] Appl. No.: 240,153

[52] U.S. Cl.................... 73/490, 73/506, 73/523
[51] Int. Cl.................... G01p 3/26, G01b 13/18
[58] Field of Search................ 73/521, 490, 491, 73/506, 523; 137/47, 50, 51, 83; 340/62; 180/108, 103

[56] References Cited
UNITED STATES PATENTS
3,578,108  5/1971  McConnell .................. 137/47
2,973,771  3/1961  Barth et al. .................. 73/523 X Primary Examiner—James J. Gill
Attorney—E. Manning Giles et al.

[57] ABSTRACT

Fluidic sensor arrangement for monitoring amount of and incremental frequency of angular displacement includes fluidic interruptable output signals and a corresponding pair of fluidic barrier sets arranged to move in unison in interruptable relation with the fluidic elements in response to angular displacement of the monitored body.

5 Claims, 5 Drawing Figures

PATENTED DEC 4 1973  3,776,043

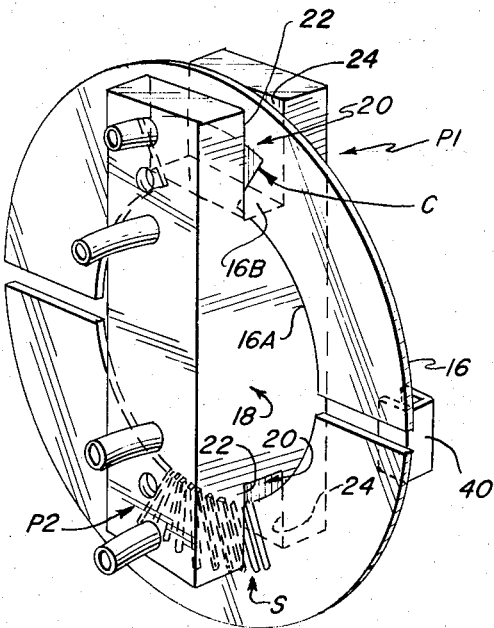
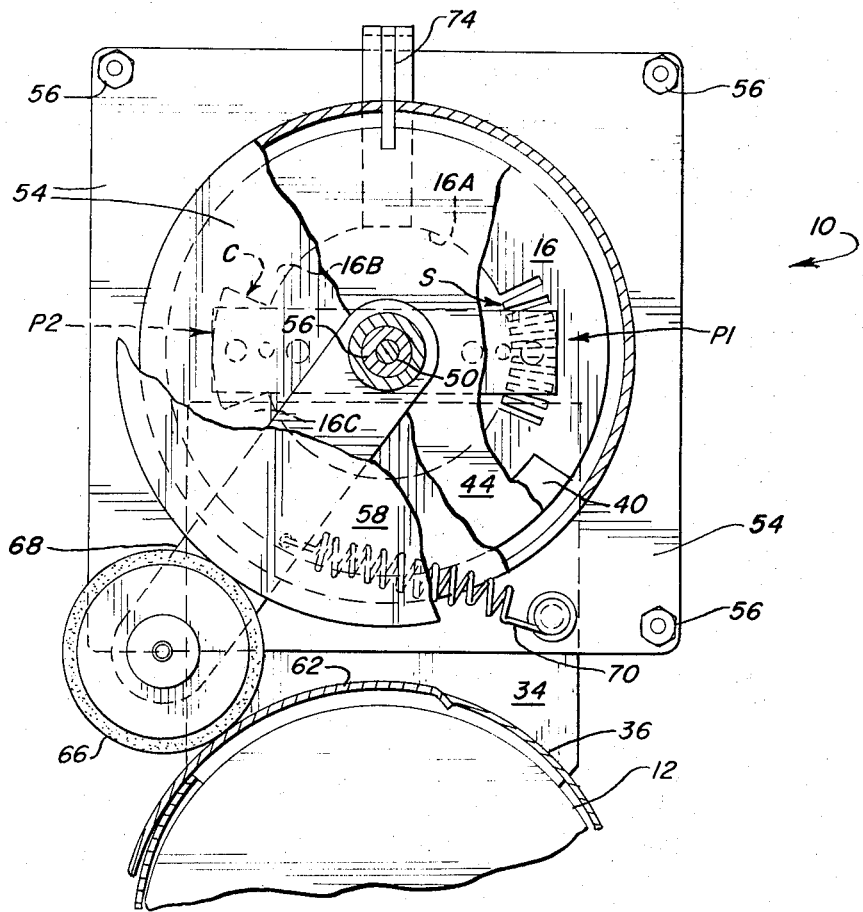

FLUIDIC ANGULAR DISPLACEMENT SENSOR

BACKGROUND OF THE INVENTION

The disclosures of the following applications are specifically incorporated herein by this reference:

i. Welk application Ser. No. 240,151, filed concurrently herewith on Mar. 31, 1972 and entitled FLUIDIC DRIVER ALERTNESS SYSTEM; and ii. Welk application Ser. No. 240,152, filed concurrently herewith on Mar. 31, 1972 and entitled FLUIDIC PICK-OFF.

The first of the foregoing applications concerns a system for sensing and responding to a condition of motor vehicle operation which, according to tests, tends to occur when the driver has fallen asleep or is, otherwise, unalert. The system incorporates a fluidic computer, utilizing low pressure compressed air as its working fluid, which responds to input information concerning the vehicle velocity, steering wheel position and wheel frequency of steering wheel movement to initiate driver warning and vehicle braking systems when the above-mentioned condition of vehicle operation exists.

The condition of vehicle operation indicative of non-alertness on the part of the driver, to which the above-mentioned computer responds is one wherein movement of the steering wheel falls below a predetermined frequency of incremental movement at a time (a) when the vehicle is travelling at or above a predetermined minimum velocity and (b) when the vehicle is not changing direction such as would require an angular displacement of the steering wheel that exceeds a predetermined minimum displacement.

A variety of electrical sensor components could be used to provide the required input signals to the flueric computer so long as an appropriate electrical-to-fluidic transducer is incorporated for compatibility purposes. However, to take full advantage of the reliability factor inherent in the use of a flueric computer, it is desirable that the sensors, likewise, be flueric. Moreover, the use of flueric sensors would have the additional advantage of cost savings through elimination of unnecessary electro-fluidic interfaces.

SUMMARY OF THE INVENTION

It is the general purpose of the present invention to provide a fluidic sensor arrangement capable of monitoring the amount of angular displacement of a steering wheel as well as the frequency of incremental displacement thereof and providing fluidic digital signals representative of these parameters.

To monitor the foregoing displacement parameters and provide fluidic signals indicative thereof, the fluidic arrangement of the present invention employs a pair of fluidic elements, each having an interruptable output signal (such as a fluidic pick-off having an interruption jet), and a pair of fluidic barrier sets, one for each fluidic element, which are fixed to move in unison in signal interruptable relation with the fluidic elements in synchronized relation with rotational displacement of the steering wheel so that one of the barrier sets acts to interrupt or block the output signal of its corresponding fluidic element upon the occurrence of a predetermined amount of rotational displacement of the steering wheel in either direction while the other of the barrier sets acts to interrupt or block its corresponding fluidic element a predetermined number of times during said amount of displacement.

A separate aspect of the present invention concerns the specific mechanism by which the fluidic digital signals are generated. In accordance with this aspect of the invention, a fluidic device for controlling transmission of each of a plurality of fluidic signals includes fluidic element means for providing a plurality of interruption jet containing fluidic signal transmission paths with the jets being disposed in radially orientated relative relation, and signal blocking means mounted for rotation relative to the fluidic element means and providing a plurality of fluidic barriers with each barrier being movable in interceptable relation with at least one of the jets to block signal transmission of the same when presented into intercepting relation therewith.

In the embodiment illustrated herein, the fluidic element means comprises a body having signal path forming channels therein which are gapped so that the body serves as a dual pick-off unit which provides two interruption jets, and the signal blocking means includes a relatively thin plate structure having a circular edge region containing a plurality of radial slots extending into the plate structure from the edge region to define the barriers as the edge regions between adjacent of the slots.

In the specific arrangement illustrated herein for providing signals representative of angular displacement and frequency of incremental angular displacement of the steering wheel of a motor vehicle, the fluidic signal controlling device is mounted along the vehicle steering column adjacent the base of the steering wheel and rotation of the barriers is controlled by a friction train arrangement which is driven by the steering wheel Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 2 is a front elevational view with parts broken away of the sensor assembly of FIG. 1;

FIG. 3 is a fragmentary view in perspective showing the barrier disk in output signal interrupting relation with the dual pick-off unit;

DETAILED DESCRIPTION

Figure 1:
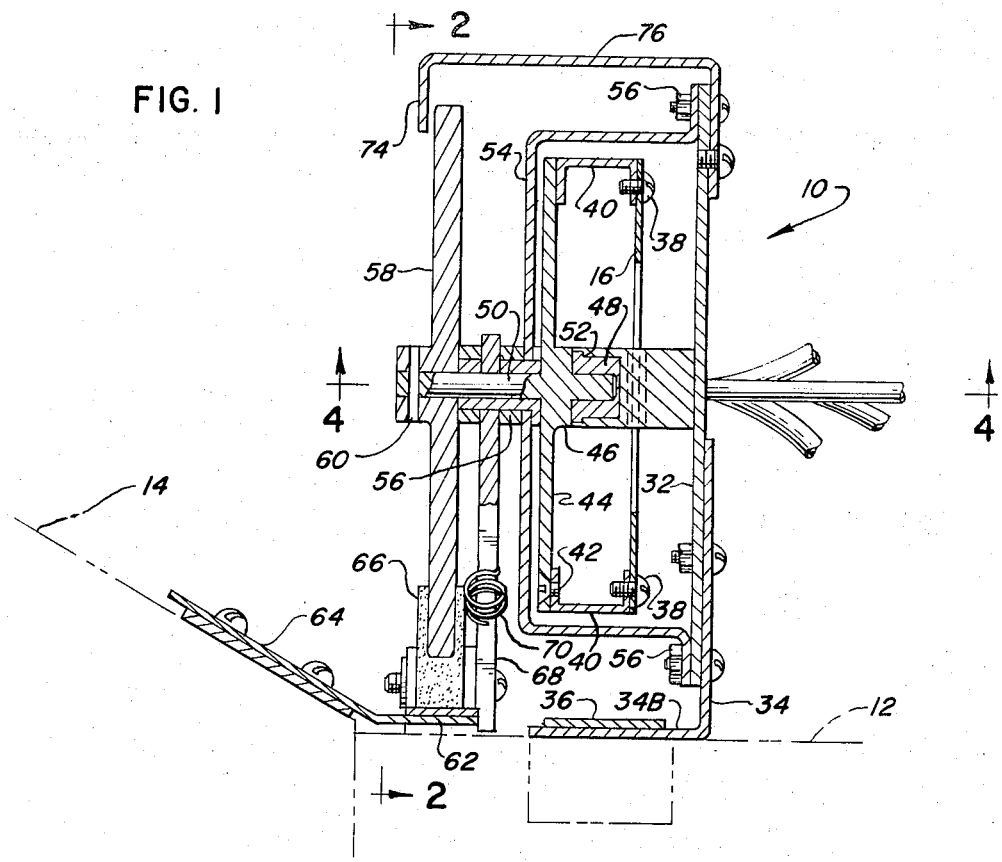
FIG. 1 is a sectional view of the sensor assembly mounted along the steering column of a motor vehicle.

With reference now to the drawings, FIGS. 1 and 2 show the presently preferred embodiment of the fluidic sensor arrangement 10 mounted along the steering column 12 adjacent the steering wheel 14 of a motor vehicle to provide output signals indicative of both angular displacement and frequency of incremental angular displacement of the vehicle steering wheel 14.

Figure 4:
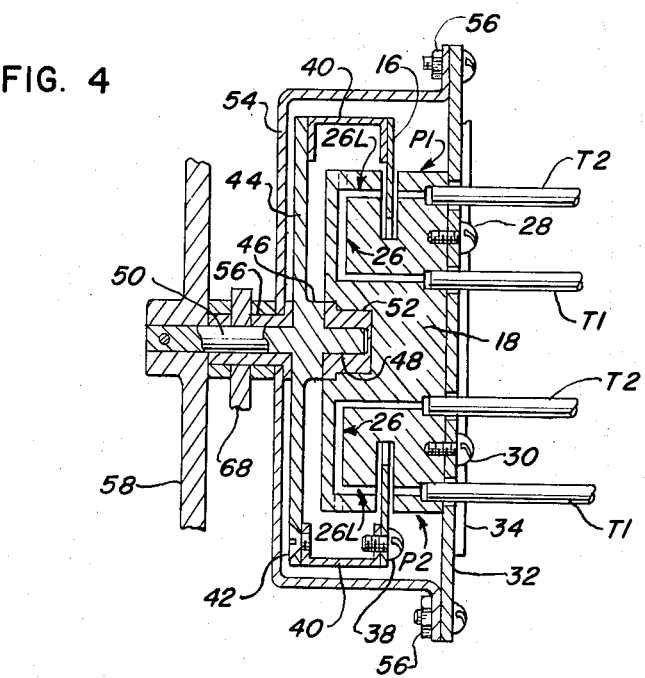
FIG. 4 is a sectional view taken, as indicated, along the line 4—4 of FIG. 1.

With reference to FIGS. 3 and 4, the sensor assembly 10 in its presently preferred form comprises a fluidic barrier disk 16 which is mounted for axial rotation in output signal interruptable relation with a pair of fluidic pick-offs or gap units P1 and P2 of a dual pick-off unit 18. The pick-off unit 18 comprises a generally block-like body having a pair of opposite gaps 20 (FIG. 3) extending therethrough and opening endwise of the unit, each gap being bounded by a pair of spaced-apart confronting walls 22, 24. Each of the two opposite ends of the body of the dual pick-off unit 18 is provided with a plurality of channel forming bores that jointly define a generally U-shaped flow channel 26 having a leg 26L that intersects the corresponding pair of confronting walls 22, 24. The two opposite ends of each of the U-shaped channels 26 are respectively connected through flexible tubing T1 to a source of air pressure (not shown) and through flexible tubing T2 to fluidic computer means (not shown). The openings 20, 20 thus each define a fluidic interruption jet gap, an interruption jet being formed thereacross due to air being supplied under pressure through tubing T1. When the interruption jet is blocked, the pressure along tubing T2 is reduced thereby resulting in a condition of no output signal. When the jet is not blocked, the pressure along tubing T2 can be made to approximate the supply pressure, thereby resulting in a condition of an output signal.

The advantages, as well as a more detailed description, of the type of fluidic pick-off illustrated herein are given in Welk application Ser. No. 240,152, mentioned above.

The function of the fluidic barrier disk 16 is to effect output signal interruption of one of the interruption jets in such a manner as to provide an indication of frequency of incremental angular displacement of the steering wheel, and to effect output signal interruption of the other interruption jet so as to provide an indication of angular displacement of the steering wheel.

To this end the barrier disk 16, which is of generally washer-like configuration, is provided with an annular array of slots S along a portion of its inner peripheral edge 16A defining therebetween a corresponding annular array of barrier surfaces. Diametrically opposite the slots S, an angular portion of the inner peripheral edge 16A is cut out as indicated at C so as to define a pair of radially spaced-apart barrier surfaces 16B, 16C.

The barrier disk 16 is mounted to rotate in gap intercepting relation with each of the gaps 20, 20 so that, upon rotation thereof, the array of barrier surfaces defined by slots S are movable in output signal interrupting relation with respect to fluidic pick-off P1 while the spaced barrier surface edges 16B, 16C are movable in output signal interrupting relation with respect to the fluidic pick-off P2.

For purposes of illustration, let it be assumed that it is desired (a) to sense and signal the frequency of angular rotation of the steering wheel through increments of 3° and (b) to sense and signal sufficient angular rotation of the steering wheel to result in a 20° turn of the vehicle.

Under these conditions the slots S each have a radial width of 3° and are radially spaced 6° so that each of the barrier surfaces has a radial width of 3°. To sense sufficient angular rotation of the steering wheel to result in a 20° turn, the barrier surface edges 16B, 16C are radially spaced 40°. With the array of slots S and the cut out region C so formed, if the barrier disk 16 is initially aligned with respect to the dual pick-off structure 18 such that the center line of the cut out region C is aligned with channel leg 26L of pick-off P2 when the steering wheel is in a centered position and if the barrier disk 16 is connected to rotate in 1:1 correspondence with the steering wheel 14, it can be seen that upon rotation of the steering wheel the array of barrier surfaces will be caused to sequentially interrupt the output signal of pick-off P1, each interruption corresponding to an increment of steering wheel rotation of 3°, and that upon 20° of such rotation in either direction one of barrier surface edges 16B, 16C will interrupt the output signal of pick-off P2. Of course, the same result can be obtained by connecting barrier disk 16 to rotate in 2:1 correspondence with the steering wheel merely by correspondingly altering the slot width and cut out width by a factor of two. Similarly any number of other relative rotational relationships could be employed.

In the preferred embodiment illustrated herein the barrier disk 16 is connected for 1:1 relative rotation with the steering wheel, the specific manner of mounting the dual pick-off 18 and barrier disk 16 being shown in FIGS. 1 to 3. The dual pick-off 18 is connected by screws 28 and 30 to a back plate 32 (see FIG. 4) which, as is best shown in FIG. 1, is supported vertically above the steering column 12 by a bracket 34 that has an arcuate base 34B securely clamped to the steering column 12 by a band 36. The barrier disk 16 is secured by screws 38 to one flange of a circular mounting rim 40 that is channel-shaped in cross section and that has its other flange secured by flat head screws 42 (only one shown) to a wheel 44 that has a central hub 46 with a pair of integral axles 48, 50 extending in opposite directions therefrom. A bearing 52 fitted within a bore in the front wall of dual pick-off unit 18 provides a journal support for axle 48 so that rotation of wheel 44 results in rotation of the barrier disk 16 in intercepting relation with gaps 20, 20. A generally cup shaped cover 54 is secured by bolts 56 to back plate 32 for housing barrier disk 16 and dual pick-off unit 18 and cooperates with a bearing 56 journeled about axle 50 to prevent axial shifting of the wheel and barrier disk relative to the dual pick-off. To provide 1:1 corresponding rotation of the barrier disk 16 with the steering wheel 14, a relatively large diameter drive sheel 58 is secured by a roll pin 60 to axle 50 of wheel 44 and a circular control band 62 of the same diameter as drive wheel 58 is fixed by bracket 64 to the base of the steering wheel 14. An idler wheel 66 which is mounted at one end of an arm 68 that is fixed to pivot at its other end about axle 50 is maintained by a spring 70 (FIG. 2) in firm engagement with control plate 62 and drive wheel 58 so as to transfer motion therebetween.

To facilitate proper alignment, the drive wheel is provided with a radial mark, which when aligned with mark 74 on indicator pointer 76, indicates that the center line of the cut out region C is aligned with channel leg 26L of pick-off P2.

The following are dimensional details concerning the barrier disk 16 and pick-off units P1 and P2 of the embodiment illustrated in FIGS. 1–5. The outer and inner diameters of the disk 16 are 2.250 inches and 1.250 inches, respectively. Slots S include a 0.039 inch slot every 6° for approximately 60°. The cut out region C extends 40°. The slots S and cut out region C are cut to a radius of 0.875 inches. The channels 26 of the pick-offs are of uniform diameter of one thirty-second inch. The gap spacings between the confronting walls 22, 24 of the pick-offs are 0.125 inch. The legs 26L of the flow channels 26 intercept the barrier disk 16 at a radius of 0.750 inch and have a length, including the gaps 20, 20, of 0.594 inch.

Figure 5:
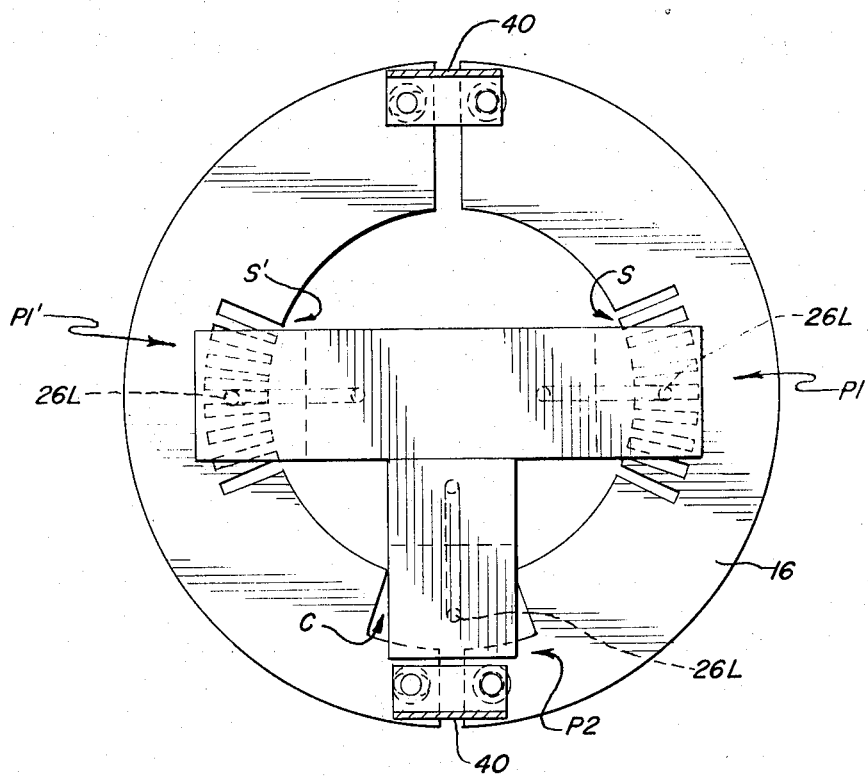
FIG. 5 is a plane view showing an alternate pick-off unit and barrier disk assembly.

With reference to FIG. 5, a modified sensor arrangement is shown wherein additional pick-off unit P1' is employed with the unit P1 to provide the signals representative of frequency of angular displacement to the computer without any possibility of noise of spurious signals being transmitted. Such signals possibly could be developed in the event an edge of a slot S was positioned under the leg 26L of the pick-off P1. In this condition the normally laminar jet becomes alternately turbulent and the resulting noise spikes could be sufficient to trigger the fluidic circuitry of the computer. To eliminate this possibility, slots S' which are identical to slots S are cut into the disk 16 to cooperate with pick-off unit P1' such that when the leg 26L of one of pick-off units P1 and P1' is centered on the edge of a slot, the leg 26L of the other pick-off cannot be so located. The outputs of pick-offs P1 and P1' are introduced to a conventional fluidic spurious signal rejection circuit (not shown) which operates to change state only upon common binary signals of pick-offs P1 and P1'. Such circuits are well known and hence need not be described herein.

Thus, while preferred constructional features of the invention are embodied in the structure illustrated herein, it is to be understood that changes and variations may be made by those skilled in the art without departing from the spirit and scope of the appended claims.

What is claimed is:

1. In a motor vehicle having a steering wheel, apparatus for monitoring and providing digital fluidic signals representative of a predetermined amount of steering wheel rotation and the frequency of incremental steering wheel rotational movement, said apparatus comprising fluidic element means providing first and second interruption jet containing fluidic signal transmission paths for respectively transmitting first and second steady state fluidic signals, signal blocking means defining first and second fluidic barrier means for respectively intercepting the jets to block signal transmission along the corresponding paths, the first of said barrier means being movable in interceptable relation with the jet of the first of said signal transmission paths and the second of said barrier means being movable in interceptable relation with the jet of the second of said signal transmission paths, and means for rotating said signal blocking means in synchronized relation to rotation of the steering wheel, said first barrier means providing barrier surfaces spaced to effect a transition in signal transmission of the jet of first of said signal transmission paths upon a predetermined amount of steering wheel rotation in either direction, said second barrier means providing barrier surfaces of uniform width and spaced to effect a predetermined number of transitions in signal transmission of the jet of the second of said signal paths upon said amount of steering wheel rotation.

2. The apparatus of claim 1 wherein said signal blocking means includes a relatively thin plate member having a generally circular peripheral plate surface region with a plurality of radial slots opening peripherally of the plate member and extending therein to jointly define said barrier means as peripheral plate surface areas between adjacent of the slots.

3. The apparatus of claim 1 wherein said signal blocking means includes a relatively thin plate member having a generally circular opening that defines a generally circular plate surface region, a plurality of radial slots extending into the plate member from the opening to jointly define said barrier means as areas of the circular plate surface region between adjacent of the slots.

4. The apparatus of claim 1 wherein said fluidic element means comprises a body having a plurality of radially orientated signal path forming channels, each of said channels being of generally U-shaped configuration with the free legs of all said channels opening through a common region of said body, and spaced-apart confronting body wall regions respectively intercepting one leg each of all said channels to form the interruption jets and to provide a bodily circumambient travel path for said signal blocking means.

5. The apparatus of claim 1 wherein said fluidic element means comprises a body having a plurality of signal path forming channels therein, one for each of said fluidic transmission paths, said channels having corresponding straight length segments intercepting a common plane in concentric radially orientated relation, and spaced-apart confronting body wall regions defining a corresponding number of gap regions in coplanar relationship with said common plane and respectively intercepting one each of said straight length segments to form the interruption jets.

* * * * *